Patented July 14, 1931

1,814,088

UNITED STATES PATENT OFFICE

GEORGE SCOTT HOUSMAN, OF NORRISTOWN, PENNSYLVANIA, ASSIGNOR TO E. J. LAVINO AND COMPANY, OF PHILADELPHIA, PENNSYLVANIA, A CORPORATION OF DELAWARE

REFRACTORY MATERIAL AND METHOD OF MAKING THE SAME

No Drawing. Application filed December 31, 1929. Serial No. 417,816.

In certain of the industrial arts refractory articles such as bricks are used in the construction of furnaces. The nature of the refractory material used in the making of such articles depends upon the service it is expected that they shall be called upon to render. Refractory materials are divided into three classes; namely, acid, neutral and basic. Typical examples of these three classes respectively may be mentioned as follows: silicon dioxide (silica), chromite and magnesite.

In addition to their chemical characteristics or qualities consideration must be given in the choosing of refractory articles for any particular furnace or other structure to other characteristics or qualities such as density, thermal conductivity, resistance to spalling, resistance to load at high temperatures, and resistance to slag penetration. However, the chemical reactivity or characteristic of the material of the refractory articles is very important and often is the deciding factor in the choice of a refractory article for any particular purpose.

The general object of the invention is to provide a new refractory material which shall combine the desirable qualities and characteristics of silica refractories with the desirable qualities of the neutral refractories, such object being accomplished by covering the particles of silica with particles of chromite or other suitable neutral substance. The addition of chromite to the silica as hereinafter more fully described does not in any way lessen the usefulness of the silica refractory but permits the use of the same in many places where it is not advisable to use a refractory of silica alone.

It also is an object of the invention to provide a refractory material comprising silica in the form of quartz, cristobalite and tridymite or a mixture thereof wherein the particles of silica are covered with a coating or layer of a neutral material whereby articles, as for example bricks manufactured therefrom, shall be neutral in character (that is, neutral with respect to acid and basic materials). Bricks manufactured of such material are highly desirable for use in the construction of basic furnaces employed in various industrial arts.

Another object of the invention is to provide a refractory material wherein the particles of silica are covered with a coating or layer of chromite (chrome ore) or other material possessing like or equivalent properties.

Another object of the invention is to provide a novel method of producing a refractory material which shall be chemically neutral and which when formed into an article such as a refractory brick shall possess the requisite characteristics of density, thermal conductivity, resistance to slag penetration and reduced tendency to spalling.

Without attempting to set forth the further objects and advantages of the invention I shall now proceed with the detailed description thereof wherein other advantages and objects of the invention will be mentioned or else such other objects and advantages will be apparent from such description.

In the carrying out of the invention a suitable chrome ore (chromite) is finely ground, preferably wet, by means of a suitable apparatus, as for example, a ball mill. The finely ground wet chromite and crushed silica rock (quartz or ganister) are then mixed together and the mixture is further ground in what is known as a "wet pan", as is usual in the manufacture of silica brick. The grinding of the mixture is continued until the proper particle size ratio and consistency have been attained. The size ratio between the particles of chromite and silica may vary depending upon the density or closeness of texture of the finished product which may be desired. By varying the relation of the sizes of the particles of the finely ground chromite to the particles of granulated silica the quality or texture of the finished product may be varied. It may be that the bond or gangue of the chrome ore may be of a character such that a change thereof should be effected. For example, it may fuse either at too high or too low a temperature. In such case a corrective material should be added to produce a bond or gangue of the character desired. The addition of such corrective materials is common in the art and well known to those skilled therein and therefore need not be referred to in further detail.

In order that the mixture produced as above described may have the physical strength necessary for setting after it has been molded or otherwise shaped into an article having the form desired a suitable binding agent is introduced. Such binding agent may consist of approximately one-half of one percent. of goulac or sulfite pitch which may be added to the mixture of the crude or raw materials in the wet pan. After the mixture thus produced is discharged from the wet pan it is molded in the same manner as articles produced from silica heretofore have been molded.

The proportions by weight of the chromite to the silica may vary from about five to thirty percent. of the chromite to ninety-five to seventy percent. of the silica; or the proportions may be approximately seventy percent. of chromite to thirty percent. of silica. It has been found that when the percentage of chromite has reached approximately thirty percent. there is a distinct drop in the refractory properties of the mixture until approximately a percentage of seventy parts of chromite to thirty parts of silica are used. When a percentage of approximately seventy percent. of chromite to thirty percent. of silica has been reached it has been found that the chromite again becomes refractory and that such a mixture may be employed in the manufacture of the usual refractory products.

Although reference has been made to the fact that a mixture including approximately seventy percent. of chromite to thirty percent. of silica may be employed it is preferred to use compositions or mixtures wherein a much smaller percentage of chromite is employed which percentage, as already indicated, may range from approximately or about five percent. to approximately or about thirty percent. When the mixture or composition includes such relatively small percentage of chromite it follows as of course that the larger or major portion of the material of the mixture shall consist of silica.

It may be noted that the thermal-conductivity increases in chrome-silica brick and other articles embodying the refractory material of my invention directly with the percentage of chromite. The tendency to spall varies indirectly or inversely with the percentage of chromite. The melting point varies indirectly or inversely with the percentage of chromite.

In the manufacture of refractory bricks the substance known as quartz usually is employed but other substances of silica, such as ganister, may be employed. Although reference has been made to chromite (chrome ore) it is to be understood that other and equivalent substances may be employed, as for example, zircon or mullite.

After the mixture of the chemically neutral substance, such for example as chromite, and silica has been formed it or portions thereof is or are molded or otherwise shaped to produce the refractory article desired. After such molding or otherwise forming or shaping has been effected the molded article is allowed to set.

It will be understood that due to the fact that the chromite or other neutral substance which is employed is finely ground the fine particles thereof will surround the particles or grains of silica.

After the molding or otherwise forming of the article and the allowing of the same to set as above suggested it is placed in a furnace and burnt. The temperatures employed in the burning operation are those usually employed in the burning of articles made of silica and need not be specified. In the resulting product the particles or grains of silica are covered with a coating or layer of the chromite or other neutral material which may be employed. The result of such covering is that the acid characteristic of the silica is prevented from manifesting itself when the article is employed, for example, in the construction of a basic furnace such as is used in certain of the industrial arts.

As already has been indicated, silica in the form of quartz usually is employed in the manufacture of refractories of the character referred to herein. During the process of burning as above described the quartz of the mixture is partially or entirely converted to tridymite and/or cristobalite. The change thus effected causes an appreciable decrease in the specific gravity and a consequent increase in volume. At the same time, however, the opposite effect takes place in the chromite which increases in specific gravity and simultaneously decreases in volume. These two opposite effects taking place within the body of the article tend to prevent variation in the size or dimensions of the article during the burning thereof but no attempt is made to balance these two effects.

It should be noted that by the admixture of the neutral substance, for example chromite, with the silica the temperature of fusion of the resulting product may be lowered, but inasmuch as the fusing point of the mixture is close to three thousand degrees Fahrenheit such lowering is practically without objection because the temperatures usually employed in the arts involving the use of refractory materials rarely if ever reach such a temperature.

Having thus described my invention, what I claim and desire to secure by Letters Patent is:

1. A refractory material adapted for the manufacture of refractory bricks and articles of other form, consisting of a mixture of silica in granular form in admixture with finely divided chromite or chrome ore, the ratio between the sizes of the granules of silica and the particles of the chromite being such as to produce a body having the density desired.

2. A refractory body consisting of silica in granular form the grains of which are coated with a coating of chromite in finely divided form.

3. The method of producing a refractory body which comprises mixing together finely divided silica and chromite, forming the mixture or portions thereof into the shape desired, and thereafter subjecting the same to high temperature.

4. A refractory material consisting of a mixture of finely divided silica and chromite.

5. A refractory material consisting of finely divided silica and chromite mixed together in the proportions of about ninety-five to seventy parts of silica to about five to thirty parts of chromite.

In testimony that I claim the foregoing as my invention, I have hereunto signed my name this 25th day of November, A. D. 1929.

GEORGE SCOTT HOUSMAN.